US006237889B1

(12) United States Patent
Bischoff

(10) Patent No.: US 6,237,889 B1
(45) Date of Patent: May 29, 2001

(54) SEAT SUSPENSION ASSEMBLY

(76) Inventor: Eric Bischoff, 1075 Park Ave., Apt 14A, New York, NY (US) 10128

( * ) Notice: Subject to any disclaimer, the term of this patent is extended or adjusted under 35 U.S.C. 154(b) by 0 days.

(21) Appl. No.: 09/116,771

(22) Filed: Jul. 16, 1998

(51) Int. Cl.[7] ................................................. F16M 13/00
(52) U.S. Cl. .......................... 248/622; 248/573; 248/550; 267/64.28; 267/64.25; 297/216.1; 180/902
(58) Field of Search ................................ 248/622, 573, 248/550, 406.2, 631; 267/64.28, 64.25, 64.26; 297/216.1, 216.19, 216.16, 216.17; 180/902

(56) References Cited

U.S. PATENT DOCUMENTS

| | | | |
|---|---|---|---|
| 1,093,741 | | 4/1914 | Stoll ........................................ 155/51 |
| 1,127,413 | | 2/1915 | Davis ....................................... 155/52 |
| 1,400,974 | | 12/1921 | Parker ...................................... 155/52 |
| 2,298,230 | | 10/1942 | Radke ....................................... 155/52 |
| 2,787,315 | | 4/1957 | Siebert ..................................... 155/51 |
| 2,892,482 | | 6/1959 | Beoletto .................................... 155/9 |
| 2,893,470 | | 7/1959 | Peller ....................................... 155/9 |
| 3,163,409 | | 12/1964 | Running et al. ........................... 267/1 |
| 3,186,674 | | 6/1965 | O'Link ..................................... 248/399 |
| 3,325,136 | * | 6/1967 | Radke et al. ............................ 248/406.2 |
| 3,601,351 | * | 8/1971 | Ambrosius ............................. 248/406.1 |
| 4,047,759 | * | 9/1977 | Koscinski ................................ 297/346 |
| 4,128,217 | * | 12/1978 | Mazelsky ................................ 244/122 R |
| 4,709,649 | | 12/1987 | Wann ....................................... 114/363 |
| 4,809,944 | * | 3/1989 | Smith et al. ............................. 248/631 |
| 4,977,848 | | 12/1990 | Currey ..................................... 114/363 |
| 5,044,299 | | 9/1991 | Frank ....................................... 114/363 |
| 5,044,587 | | 9/1991 | Degen ...................................... 248/158 |
| 5,169,112 | * | 12/1992 | Boyles et al. ........................... 248/550 |
| 5,176,355 | * | 1/1993 | Carter ...................................... 248/550 |
| 5,234,203 | * | 8/1993 | Smith ....................................... 267/131 |
| 5,273,260 | * | 12/1993 | Nagata ..................................... 267/131 |
| 5,294,085 | * | 3/1994 | Lloyd et al. ............................. 248/562 |
| 5,309,861 | | 5/1994 | Mardikian ................................ 114/363 |
| 5,324,095 | | 6/1994 | Yamauchi ................................ 297/344.14 |
| 5,367,978 | | 11/1994 | Mardikian ................................ 114/363 |
| 5,451,094 | | 9/1995 | Templin et al. ......................... 297/216.17 |
| 5,542,371 | | 8/1996 | Harvey et al. ........................... 114/363 |
| 5,642,916 | | 7/1997 | Dybro et al. ............................ 297/216.18 |
| 5,676,336 | * | 10/1997 | Nefy et al. .............................. 244/122 R |
| 5,735,509 | * | 4/1998 | Gryp et al. .............................. 267/131 |
| 5,758,859 | * | 6/1998 | Gonzalez ................................. 248/619 |

OTHER PUBLICATIONS

Glide Ryde Marine Suspension Seating, product literature and pictures of device, undated.
Industrial Seating Inc. product sheet, Model #4805S, undated.
Mariner Suspension Seats Brochure, Seats Incorporated, Reedsburg, Wisconsin, 1990 H.O. Bostrom Seapost™ Series Brochure, H.O. Bostrom Company, Inc., Waukesha, Wisconsin, undated.

* cited by examiner

Primary Examiner—Ramon O. Ramirez
Assistant Examiner—Kimberly Wood
(74) Attorney, Agent, or Firm—Hoffmann & Baron, LLP

(57) ABSTRACT

A seat assembly for accommodating vibrations imparted thereto including a seat having a bottom surface, a frame including a base secured to a fixed surface and a support member extending upwardly therefrom. A substantially rigid pivot member is provided which includes a forward portion and a rearward portion. The pivot member being pivotally secured to the frame at a pivot point disposed on the pivot member between the forward portion and the rearward portion, and the forward portion being pivotally secured to the seat, the pivot member permitting the seat to move relative to the fixed surface. A biasing device is included which extends between the frame and the rearward portion of the pivot member to accommodate the movement between the seat and the frame.

17 Claims, 12 Drawing Sheets

SEAT SUSPENSION ASSEMBLY

FIELD OF THE INVENTION

The present invention relates to a seat suspension assembly having shock absorbing capabilities for accommodating shock waves imparted thereto. More particularly, the present invention relates to a seat suspension assembly for use in a water craft or land vehicle having a shock accommodating and dissipating capability for isolating an occupant of the seat from shock waves imparted on the water craft or vehicle.

BACKGROUND OF THE INVENTION

It is well known that occupants of water crafts, especially small boats, may experience a jarring and unsettling ride as the boat moves through the water. As the waves impact the hull of the boat, the shock waves are almost directly transferred to the occupant. Such shock waves can seriously diminish the enjoyment and comfort of the boat passengers. In extreme cases, the harshness of the ride may lead to spinal injuries or at the very least aggravate preexisting spinal conditions. The discomfort is especially prevalent if the boat is relatively small and is moving fast through chopping water.

The harshness of the ride is often only slightly mitigated by the typical boat seat. Standard boat seats are rigidly secured to the deck of the boat and include a cushion material which provides only a minimal amount of shock accommodation and dissipation. Therefore, an occupant sitting in a typical boat seat is subjected to some discomfort as the boat travels through the water. Such discomfort is especially troublesome if the occupant is suffering from a soar back or neck and may lead to individuals refraining from engaging in water craft associated activities. In addition to the discomfort resulting from the motion of the boat as it travels through the water, the driver of the boat may find it difficult to maintain control since they are being tossed about. Such a jarring ride makes it difficult to hold the steering device steady and to maintain control over the throttle.

The experience of being tossed about in one's seat can also be experienced by those riding in land vehicles especially off-road passenger vehicles and/or construction type vehicles. Even though such vehicles include suspension systems which are designed to somewhat isolate the occupants from the irregularities in the roadway, the suspension systems are limited in their capacity to do that and the passengers still can receive significant vibrations especially if the vehicle is moving rapidly over rough terrain.

Attempts have been made in the prior art in order to accommodate shock waves imparted to boats or land vehicles. One such an attempt is disclosed in U.S. Pat. No. 5,044,299 to Frank. Frank discloses a seat construction for a boat that comprises a support sleeve arranged for mounting on a boat with a longitudinal axis vertically of the boat. An elongate seat support element is slidably slidable longitudinally of the sleeve and is configured and is confined by an upper bearing element of the sleeve and a lower bearing element of the sleeve. The spring is retained within the sleeve and adapted to permit the seat support element to extend therein. The seat support element is permitted to move under bias of the spring in a vertical direction. Therefore, the seat construction provides flexibility to the seat in order to accommodate vertical shock. However, the Frank device requires that the sleeve extend below the deck of the boat which would require significant modifications in order to install this an existing boat. In addition, the spring has a fixed spring rate and therefore could not be adjusted depending on the weight of the occupant of the seat or the nature of the desired ride, e.g., soft or hard. Furthermore, there is no separate shock dampening device, therefore, the occupant may end up bouncing up and down with the seat in an exaggerated manner in response to a shock wave hitting the boat.

U.S. Pat. No. 2,893,470 to Peller discloses an adjustable seat with shock adsorbing capabilities. The seat includes a pair of telescoping cylinders which contain a coil spring surrounding a hydraulic shock absorber. The height of the seat can be adjusted by rotation of a handle which through a series of gears adjusts the distance between the bottom of the shock absorber and the bottom of the surface to which the seat is mounted. In this design, the telescoping cylinders form a pedestal directly beneath the seating surface of the seat. Therefore, the seating surface must be spaced a significant distance from the mounting surface, which would make this design difficult to use in a retrofit situation.

Use of telescoping cylinders with a spring and shock adsorbing apparatus formed therein is also disclosed in U.S. Pat. No. 1,400,974 to Parker. This design discloses the use of two pedestals formed underneath the seating surface.

U.S. Pat. No. 5,342,095 to Yamauchi discloses a suspension seat for an automotive vehicle including a seat frame which is vertically movably supported on a parallel link mechanism having front and rear links. A compression spring and shock absorber coaxially combined is provided and is installed between the upper backside of the portion of the seat frame and an arm portion connected to the rear link. The forward link includes a cross member which extends across the front of the seat underneath the cushion. Therefore, the space beneath the seat is not clear of restrictions. In addition, the suspension system provides for an adjustment capability in order to accommodate various loadings, i.e., occupants of different weights and various road conditions. However, the adjustment device requires that a threaded shaft be rotated in one embodiment or a nut device be turned. Accordingly, these adjustments are difficult to make and would be impossible to do while the occupant is sitting in the chair with the vehicle moving.

In boating applications it is becoming ever more popular to provide seats having a seating section which can be selectively swung out of the way in order to allow the occupant to move from a seated position to a standing position. Being able to stand at the seat has various benefits including permitting an occupant to have increased visibility while still have access to the various boat controls.

Accordingly, it would be desirable to provide a seat having a suspension system adsorbing vibrations and impacts imparted thereto wherein the characteristics of the shock adsorbing capability are easily adjustable by an occupant of the seat.

It would be also desirable to provide a seat and suspension system wherein the area beneath the seating surface of the seat is unobstructed thereby permitting a low profile design which is desired in both retrofit applications and applications requiring the seat to be swung out of the way allowing the occupant to move from a sitting position to a standing position.

SUMMARY OF THE INVENTION

It is an object of the present invention to provide a seat suspension assembly for isolating an occupant of the seat from shocks imparted to the assembly.

It is a further objective of the present invention to provide a seat suspension assembly including a seat having a bottom surface and a frame having a base secured to a fixed surface and a support member extending upwardly therefrom. A substantially rigid pivot member is also provided having a forward portion and a rearward portion. The pivot member is pivotally secured to the frame at a pivot point disposed on the pivot member between the forward portion and the rearward portion. The forward portion is pivotally secured to the seat. The pivot member permits the seat to move relative to the fixed surface. A biasing device extends between the frame and the rearward portion of the pivot member to accommodate the movement between the seat and the frame.

It is yet a further objective of the present invention to provide a seat assembly including a seat having a seating surface rotatably secured thereto. The seating surface being selectively rotatable between a horizontal position and a vertical position to permit an occupant of the seat to sit or stand. A frame is provided and is secured to a fixed surface. The assembly also including a pivot member having a first portion rotatably secured to the frame and a second portion rotatably secured to the seat thereby permitting the seat to move relative to the fixed surface. A suspension system is disposed between the pivot member and the frame to permit controlled movement of the seat relative to the frame.

It is still a further object of the present invention to provide a seat assembly including a seat, a frame secured to a fixed surface and a rigid pivot member having a first portion rotatably secured to the frame and a second portion rotatably secured to the seat thereby permitting the seat to move relative to the fixed surface. An air spring and shock absorber are also provided. The air spring and shock absorber being disposed between the pivot member and the frame to permit controlled movement of the seat relative to the fixed surface and isolated the seat and an individual seated within from shocks imparted on the fixed surface.

In the efficient attainment of these and other objectives, the present invention provides a pneumatic control system having a controller for adjusting the spring rate of the air spring thereby adjusting the characteristics of the suspension system. The control system includes a controller operatively connected to a pressure source and the air spring for controlling a supply of pressurized air to the air spring. The controller is preferably disposed on the seat such that the controller may be actuated by an occupant of the seat.

As more specifically described by way of the preferred embodiment herein, the pivot member includes a transverse member having a pair of spaced arms extending outwardly and upwardly therefrom forming a froward portion which is rotatably connected to side edges of the seat. A rearward support extends upwardly and rearwardly from the transverse member forming an attachment surface for a first end of the air spring and shock absorber.

DETAILED DESCRIPTION OF THE PREFERRED EMBODIMENTS

Figure 1:
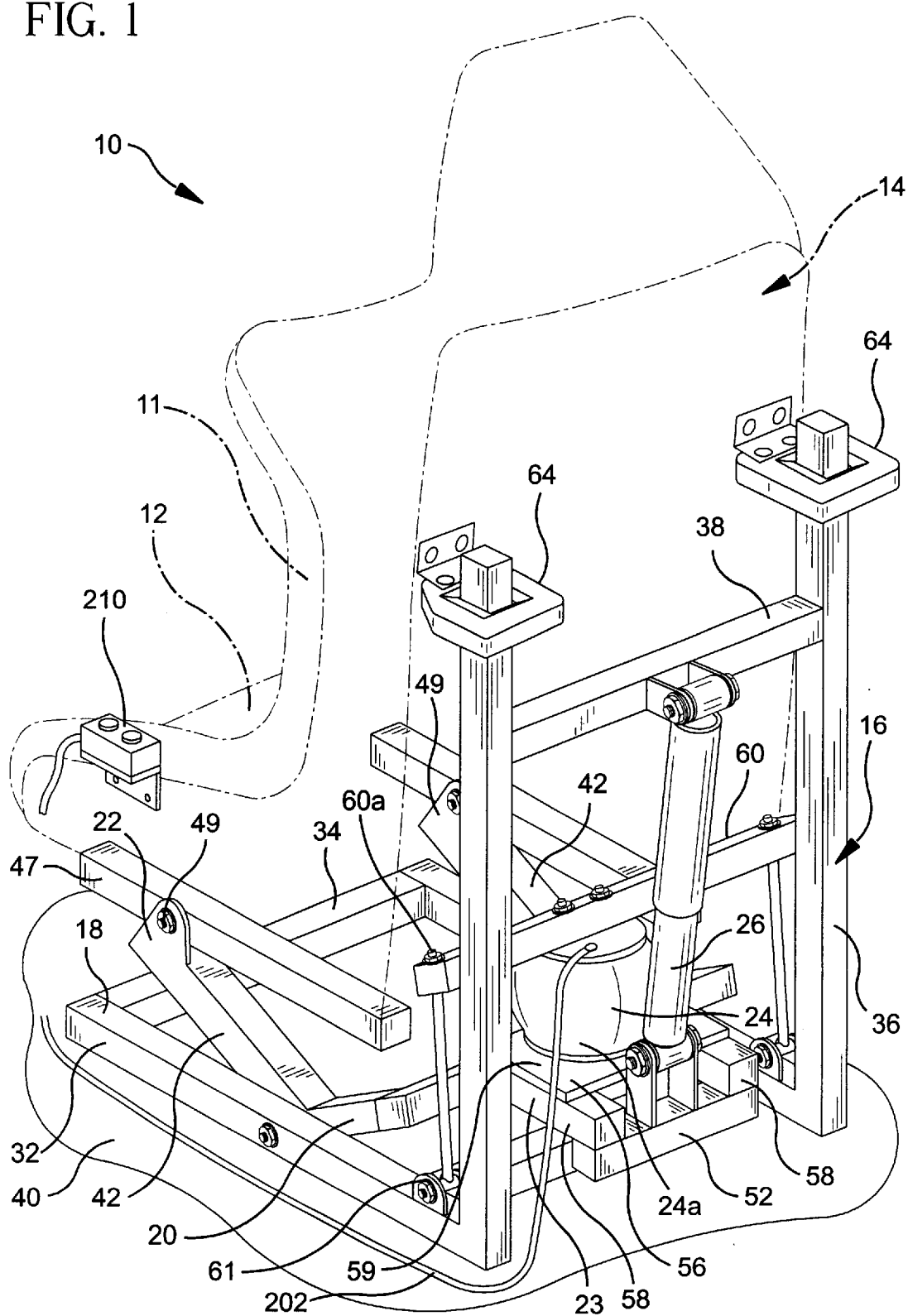
FIG. 1 is a rear perspective view of the seat suspension of the present invention.
Figure 2:
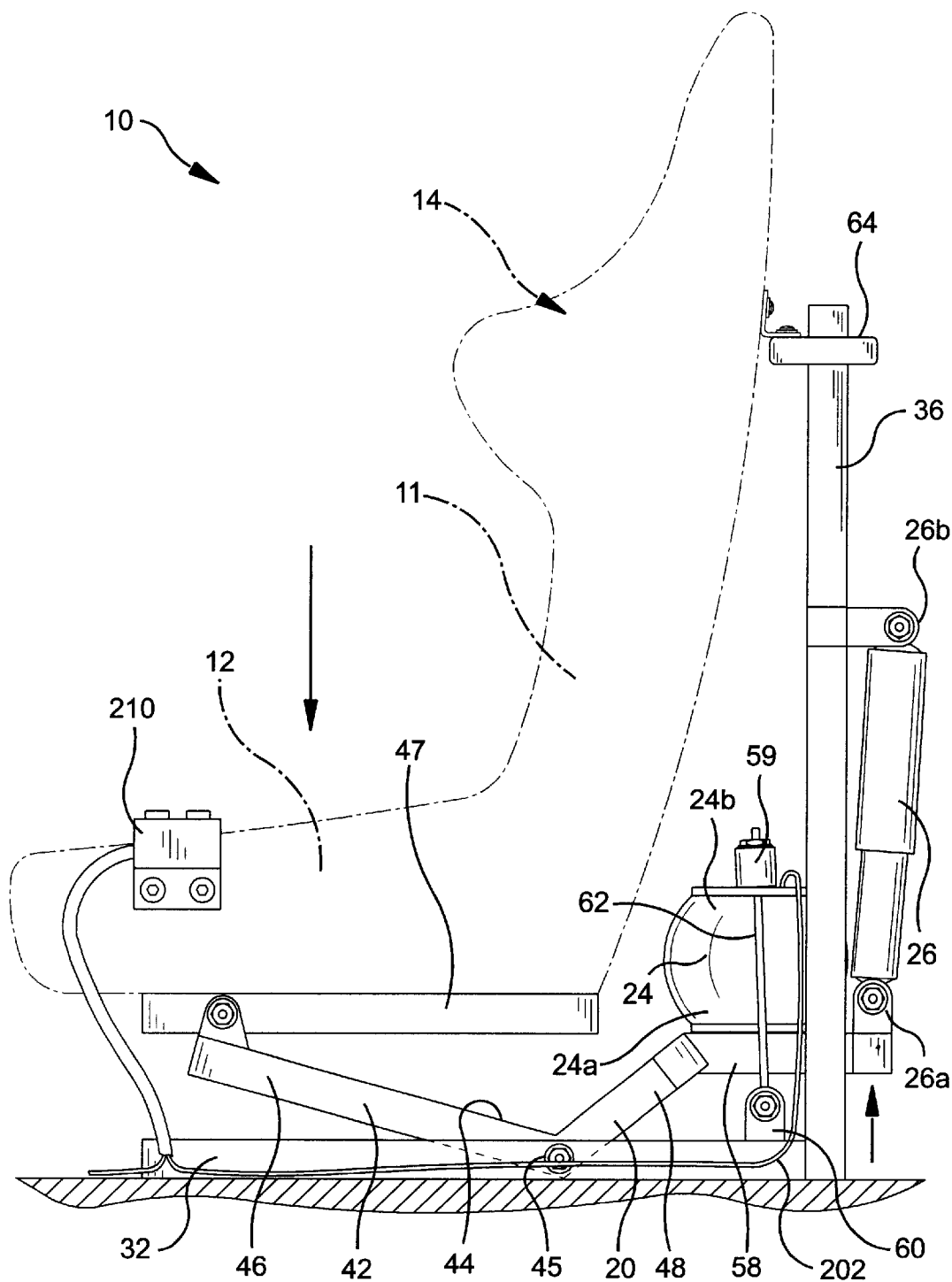
FIG. 2 is a side elevational view of the seat of FIG. 1.
Figure 3:
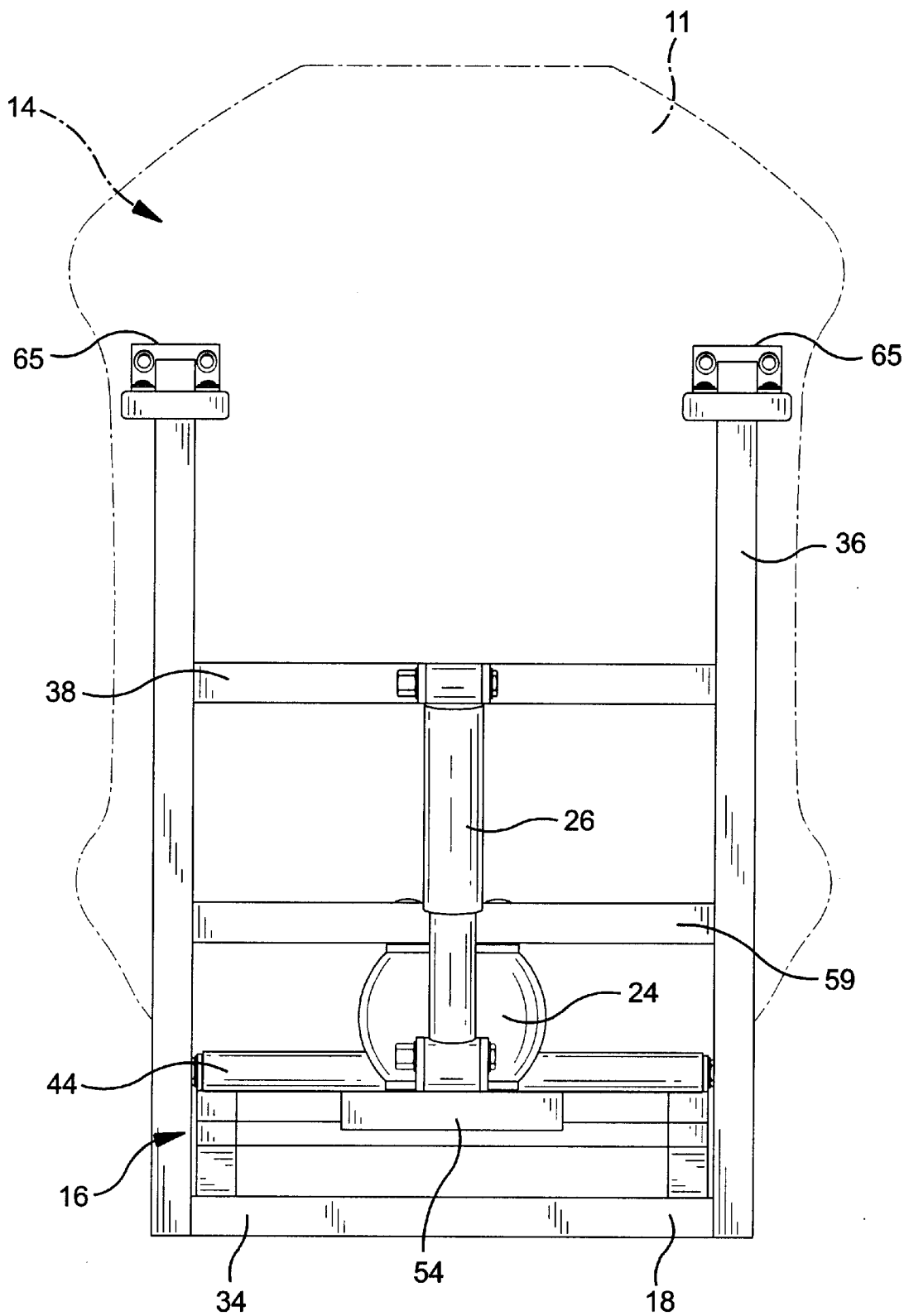
FIG. 3 is a rear elevational view of the seat of FIG. 1.

The seat suspension assembly of the present invention provides the ability to absorb shocks and impacts imparted to a water craft or vehicle thereby substantially isolating the occupant of the seat from severe vibrations caused by the impacts. Referring to FIGS. 1–3, the seat suspension assembly, shown generally as 10, includes a seat 11 having a substantially horizontal seating surface 12 secured to an upwardly extending back rest 14. Seat 11 may be one of any number of conventional seats well known in the art. While seat 11 preferably includes a seating surface and a back rest 14, it is within the contemplation of the present invention that seat 11 may be formed without a back rest in a bench style. Seat 11 is attached to a frame 16 having a base 18 rigidly mounted to a fixed surface 40 such as the deck of a water craft or floor of a vehicle. A pivot member 20 pivotally secured to base 18 is further provided. Pivot member 20 is also pivotally secured at a forward end 22 to seat 11 and at a rearward end 23 to a biasing device 24, preferably an air spring, and a dampening device 26, preferably a shock absorber 26. Seat 11 is permitted to move relative to fixed surface 40 and frame 16 in a manner regulated by the suspension system including the biasing/dampening device combination.

The seat suspension assembly 10 of the present invention may be used in variety of applications including boats which are subjected to significant impacts as they travel through water. Boats typically include rigid hull construction and any impact imparted on the hull will be transfer directly to a seat. Even water craft having inflatable hulls have operational pressures which form a fairly rigid hull resulting in a jarring ride for the occupants. The seat suspension assembly of the present invention provides the ability to somewhat isolate the occupant of the seat from such impacts, thereby reducing the likelihood of injury and allowing for more a comfortable and pleasant ride. In addition, seat suspension assembly 10 permits an occupant who is driving the boat to remain relatively unjarred increasing the ability to properly control of the steering wheel and throttle. While the present invention is particularly useful in water craft, it is within the contemplation of the present invention that the seat suspension assembly may also be employed in other crafts including land vehicles, such as sport utility vehicles and off-road construction equipment. Such vehicles also typically encounter impacts which are transmitted to the vehicle's occupants.

In the embodiment shown in FIGS. 1–3, frame 16 includes base 18 having longitudinally extending rails 32 preferably connected by a pair of cross members 34. A pair of spaced back rails 36 extend upwardly from the space longitudinal bottom rails 32 giving frame 16 a somewhat L-shaped profile. The back rails 36 may be joined together by a transverse member 38 extending therebetween in order to provide rigidity to the base. Base 18 may be rigidly secured to a fixed surface 40, i.e., the deck of the boat or floor of a vehicle. Such securement may be achieved by the use of bolts extending through the base rails 32 into the fixed surface 40, however, the manner of securement may be performed in any manner well known in the art. Frame 16 is preferably formed of welded sections of square profile tubular aluminum or steel of the type well known in the art. These tubular members may be treated to increase corrosion resistance through known processes such as plating, anodizing or painting. Alternatively, frame 16 may be formed of bent tubular material having a variety of profiles.

Pivot member 20 is pivotally secured to frame 16 preferably to the bottom longitudinal rails 32 of base 18. Pivot member 20 in a top plan view is generally Y-shaped member having two arms 42 extending from a centrally disposed rear transverse member 44. In the embodiment shown in FIGS. 1–3, each arm 42 is similarly formed and has a centrally disposed elbow 44 from which a forward member 46 and rearward member 48 extend generally upwardly and outwardly therefrom in opposite directions forming a V-shaped structure. The elbow 44 of each arm is rotationally secured to one of the base longitudinal rails 32 about a pivot point 45. The rotational connection may be achieved by way of a bolt extending through elbow 44 and rail 32 or in any manner which is well known in the connection art. Elbow 44 and rail 32 may include a bushing (not shown) extending therethrough to provide support for the bolt. Forward members 46 are preferably pivotally secured to seat rails 47 which are rigidly attached to the side bottom edges of seat 11. Arms 42 are spaced apart from each other and extend along the side edges of the seat thereby leaving the area beneath the seating surface 12 unobstructed. The pivotal connection between arms 42 and seat rails 47 may be formed by way of a bolt and nut combination 50 with a bolt extending though a clearance hole in seat rails 47 and through a pair of spaced lugs 49 formed on the forward ends 22 of pivot member 20. Alternatively, the pivotal connection could be provided by use of a pin and clip combination or in any manner which is known in the art. Accordingly, pivot member 20 permits seat 11 to move relative to fixed surface 40 and frame 16 attached thereto.

Arm rearward members 48 each extend from the base/elbow pivot point 43 rearwardly beyond the back of seating surface 12. The rearward ends 23 of rearward members 48 are joined together by a cross member 54. Extending outwardly from cross member 54 is a generally horizontal mounting platform 56. Mounting platform 56 may include a pair of spaced rail sections 58 covered by a plate 59 to which a first end 24a of air spring 24 may be attached. Mounting platform 56 may also include a transverse member 52 to which a shock absorber first end 26a may be pivotally secured. Shock absorber second end 26b may be pivotally secured to back rail cross member 38, and the air spring second end 24b may be secured to a mounting bar 60. Mounting bar 60 is preferably a rigid member pivotally mounted to base bottom 30 through pivotal connections 61. Threaded tie rods 62 may extend upwardly from the pivotal connection 61 and rigidly connect to the ends 60a of mounting bar 60 to provide the pivotal connection. By permitting mounting bar 59 to rotate, air spring 24 may rotate in unison with pivot member 20, therefore, mounting ends 24a, 24b of air spring 24 remain in relative axial alignment.

Pivot member 20 may be formed of welded or bent tubular members out of a variety of materials including steel or aluminum. The pivot member is preferably rigid such that the motion of seat 11 will be directly transmitted to the biasing and dampening components.

Due to the configuration of the present invention, the air spring and shock are positioned behind the seat. In addition, the only members which extend underneath the seat, are arms 42 and they are spaced to engage the side edges of the seat. Accordingly, the area beneath the seat is essentially free of any obstruction. This permits the seat 11 to be mounted relatively close to fixed surface 40, permitting the seat assembly to be employed in a wide variety of applications including retrofits and those discussed below with respect to FIGS. 9–11.

With reference to FIG. 2, the movement of seat 11 and pivot member 20 will now be described. When a load is exerted downwardly on seat 11 in the form of an occupant's weight, pivot member 20 will rotate about pivot point 45 relative to frame 16. Arm forward member 46 will therefore rotate downwardly and rearward members 48 will move upwardly along with mounting platform 56 resulting in compression of air spring 24 and shock absorber 26. The spring rate of the air spring can be adjusted so that the weight of the occupant can be compensated for while permitting the suspension to provide a comfortable ride for the occupant. When a vertically imparted shock caused, for example, by a boat moving through the water, is transmitted to the seat, the frame which is fixed to the craft will move upwardly. The inertia of the occupant and seat will tend to keep the seat at rest. Accordingly, pivot member 20 will rotate resulting in compression of the air spring 24 and shock absorber 26. Air spring 24 will accommodate the vertical movement and shock absorber 26 will provide a dampening function to limit the spring oscillations. During movement of pivot member 20, air spring 24 is kept in axial alignment due to the pivotal nature of mounting bar 59. Shock absorber 26 is kept in axial alignment since it is rotatably connected at both ends 26a and 26b. In addition, frame 16 may further include a stop (not shown) which limits the movement of pivot member 20 to prevent air spring 24 from being overly compressed. The stop may be formed by a member extending from the frame to prevent excessive upward rotation of pivot arm rearward member 48 or excessive downward rotation of pivot arm forward member 46.

In order to guide seat 11 in its essentially vertical translation, guide blocks 64 are provided. Guide blocks 64 may be rigidly secured to the back rest 14 by an L bracket 65 and slidably insertable over the ends of back rails 36. In addition to permitting unrestricted vertical translation of seat 11, guide blocks 64 are formed to allow a small degree of rotation of seat 11 relative to back rails 36 which will occur when the seat moves up and down on pivot member 20. In operation, seat 11 requires only small amounts of vertical translation in order to adequately accommodate the imparted shocks. Accordingly, actual seat movement is typically no more than two or three inches. Therefore, the amount of rotation of the seat due to its pivotal connection is relatively slight.

Figure 4:
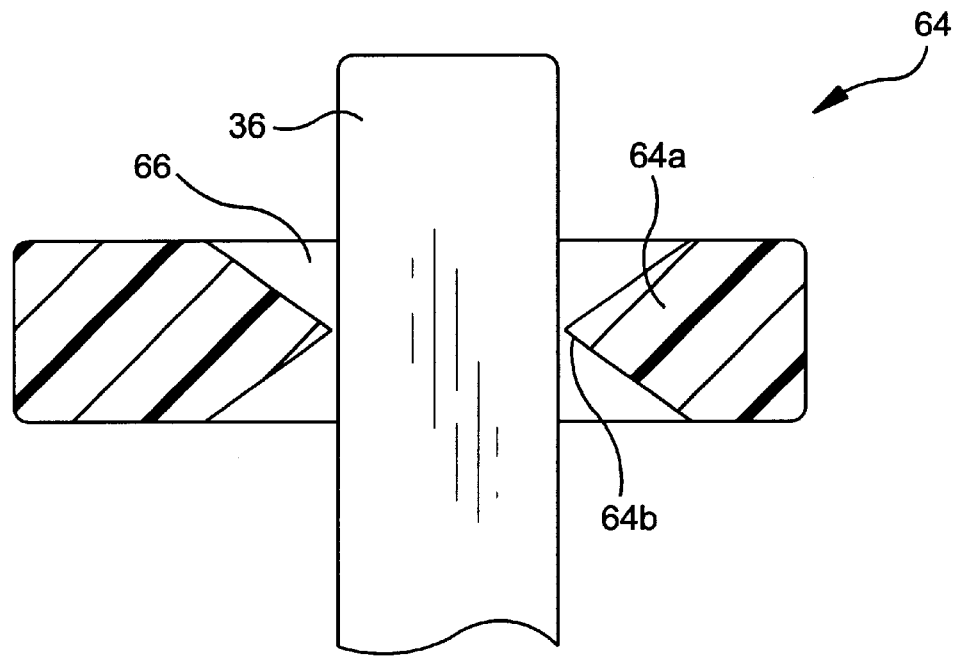
FIG. 4 is a sectional view of a guide block in the present invention.
Figure 5:
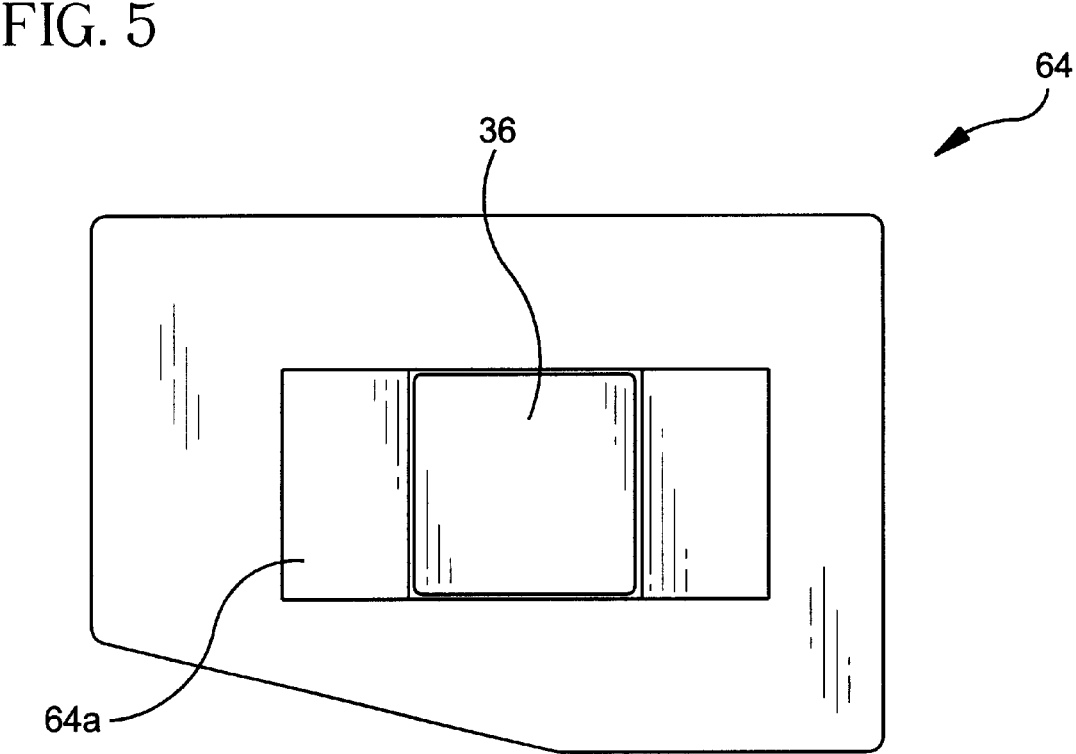
FIG. 5 is a plan elevational view of the rail and guide block of the present invention.

As shown in FIGS. 4 and 5, each guide block 64 includes an opening 66 through which a back rail 36 may extend. In section, shown in FIG. 4, guide block 64 has a V-shaped portion 64a, the points 64b of which engage the front and back of the rail. This arrangement allows guide block 64 and seat 11 attached thereto, to pivot to a small degree with respect to the back rails 36. Guide blocks 64 may be formed from a wide variety of bushing type material, preferably a polyurethane or other engineered polymer such as acetal resin or polyamide.

Figure 6:
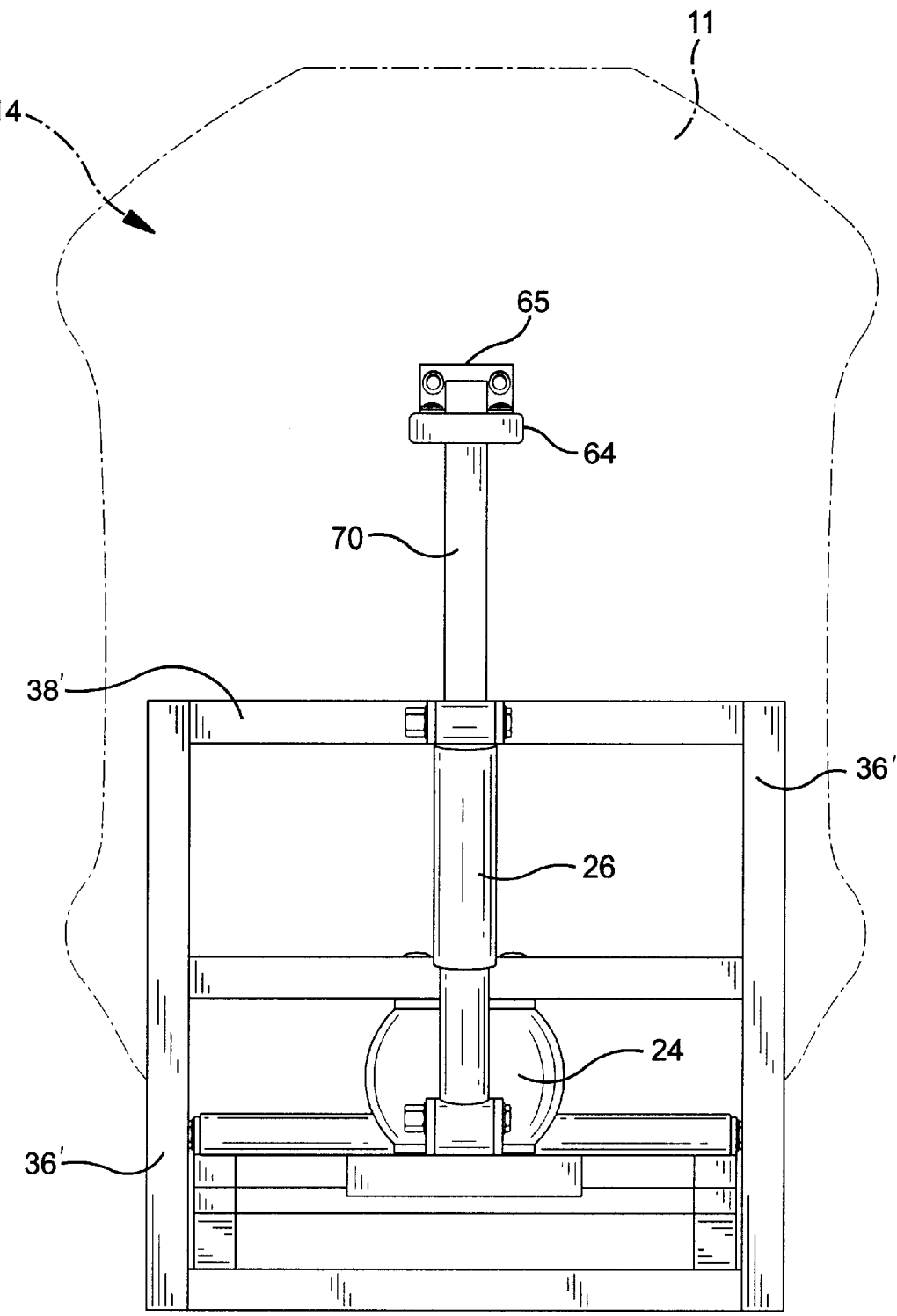
FIG. 6 is a rear elevational view of an alternative embodiment of the suspension seat.

In an alternative embodiment shown in FIG. 6, the two upwardly extending back rails 36' are joined together by a transverse member 38' to which the shock absorber second end 26b is attached. Extending upwardly from a central portion of transverse member 38' is a support rail 70 forming a support for the back rest of the seat. A guide block 64 formed of a polyamide, as described with regard to the previous embodiment, may be attached to seat back rest 14 and slide over the support rail 70.

Figure 7:
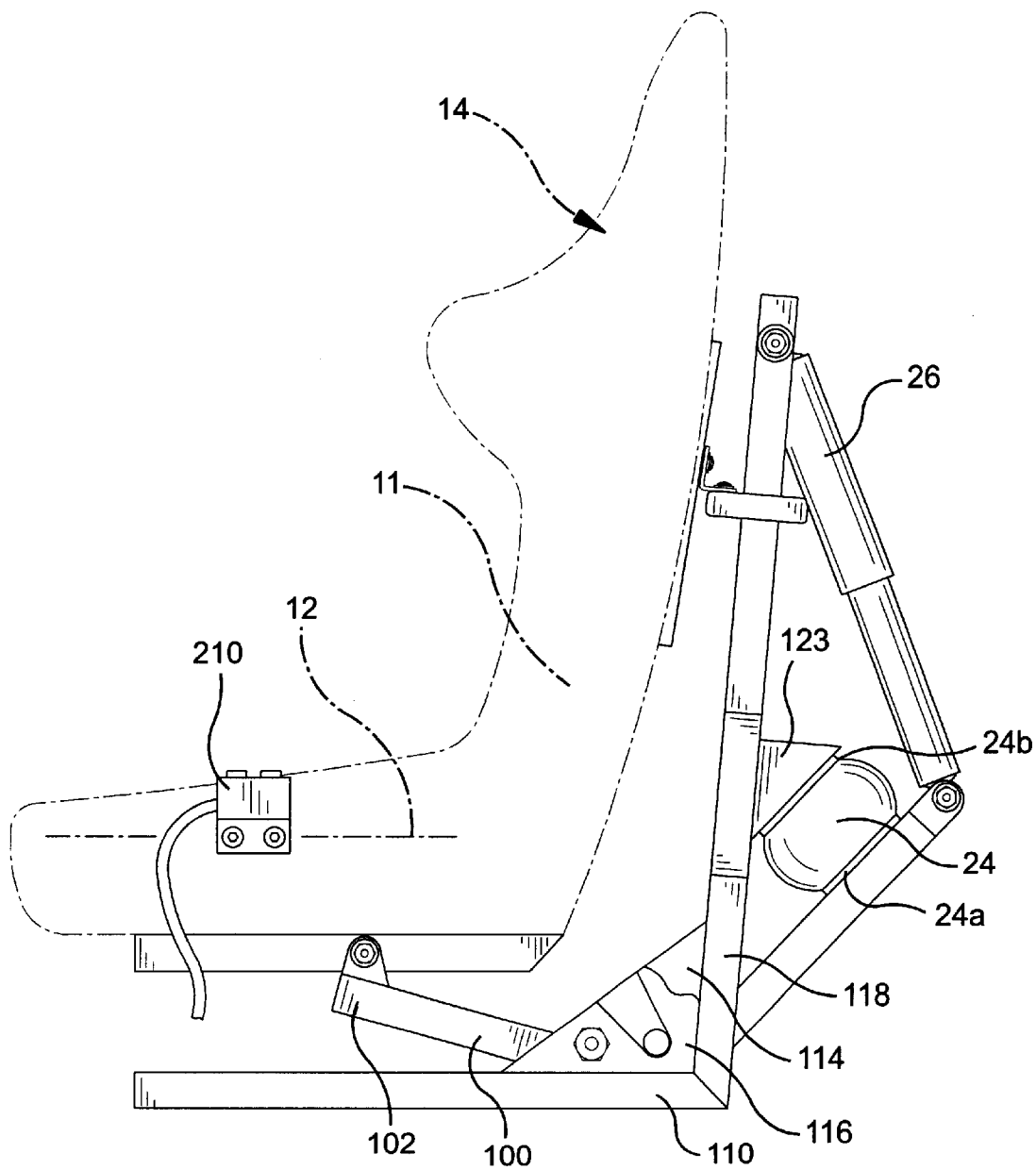
FIG. 7 is a side elevational view of the preferred embodiment of the present invention.
Figure 8:
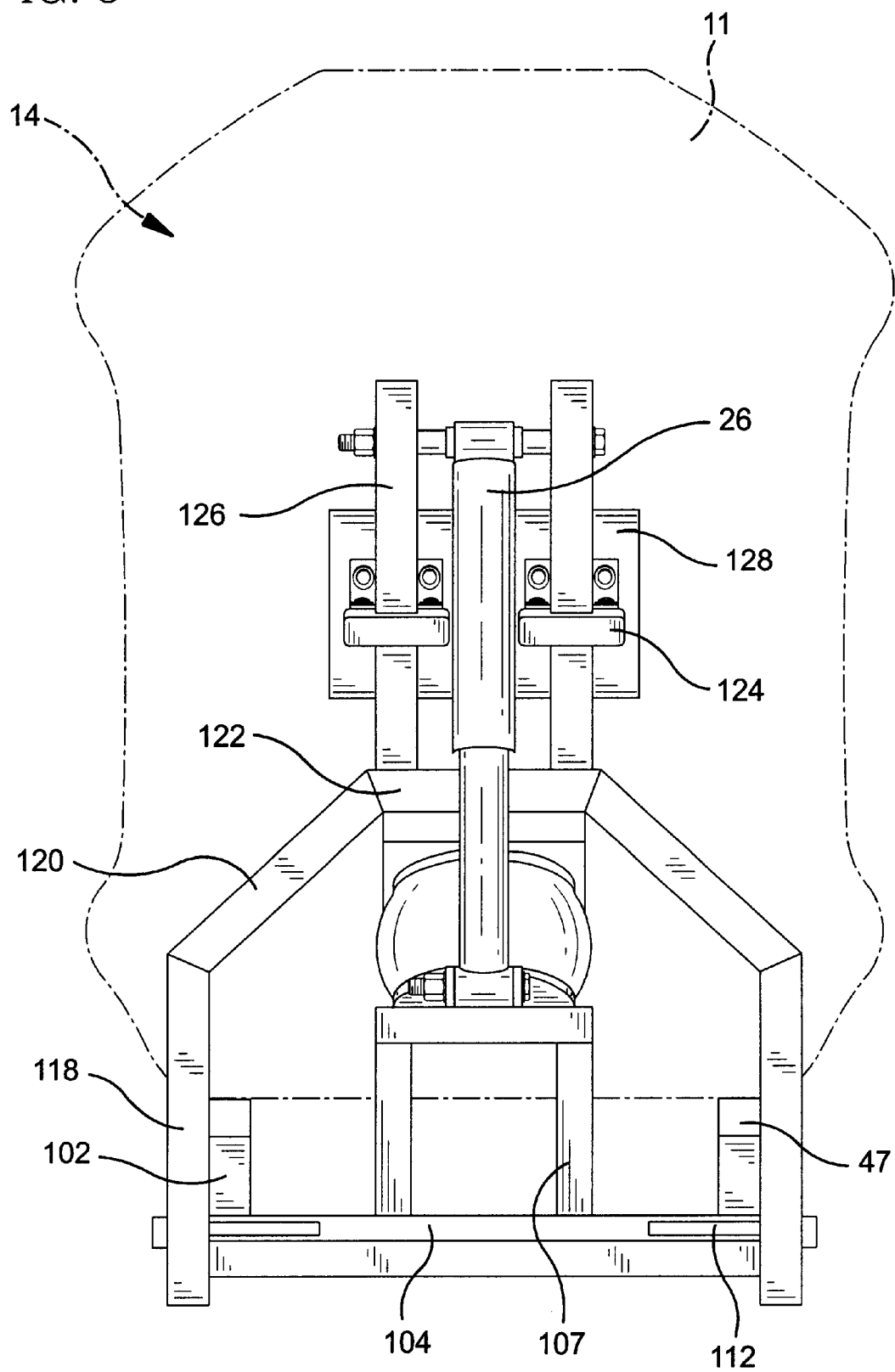
FIG. 8 is a rear elevational view of the preferred embodiment shown in FIG. 7.
Figure 8A:
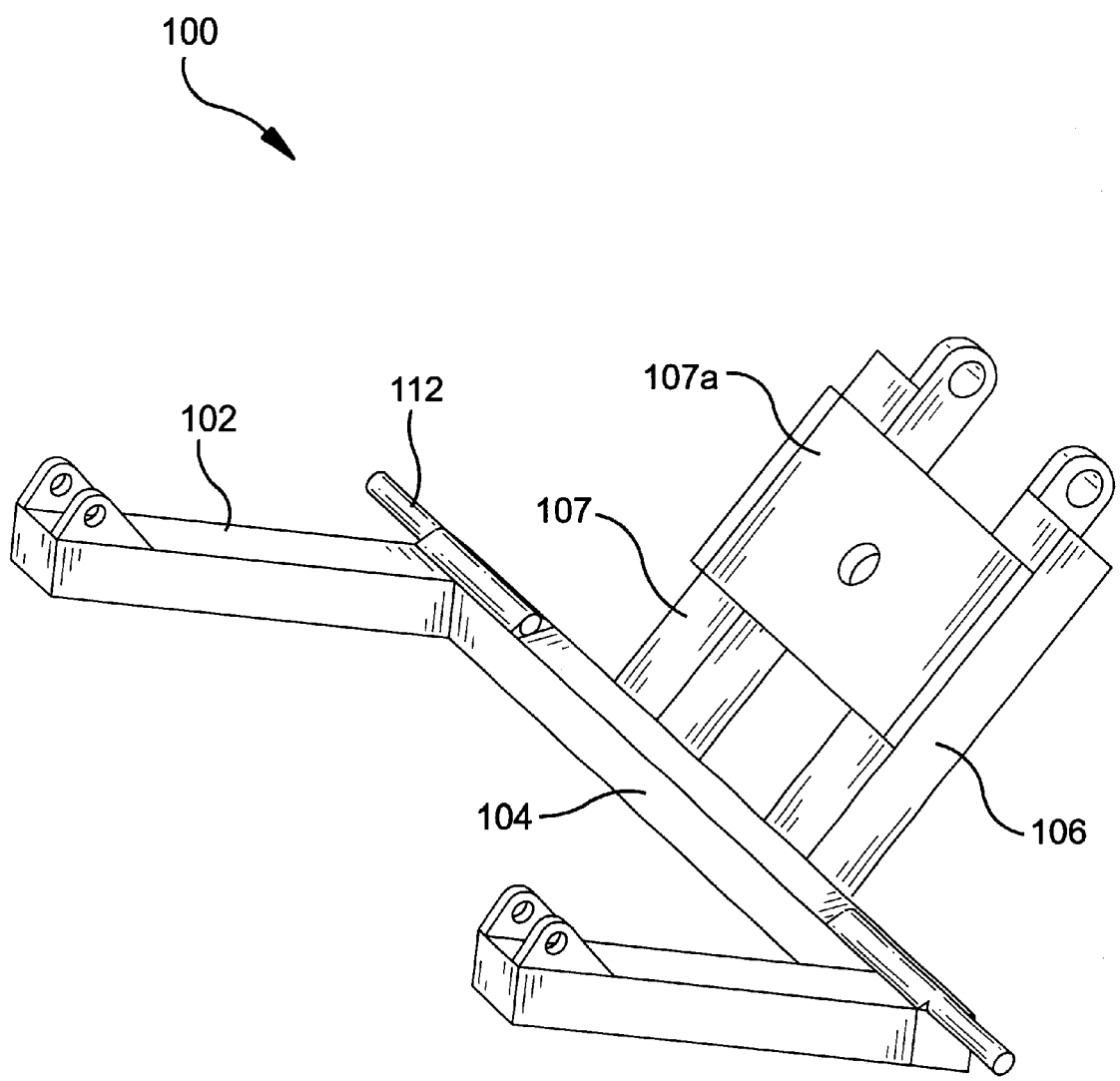
FIG. 8A is a perspective view of the pivot member of FIG. 7.

A preferred embodiment of the present invention is shown in FIGS. 7, 8 and 8A. The pivot member and frame are modified to provide a compact and efficient design. With particular reference to FIG. 8A, pivot member 100 includes a pair of spaced arms 102 extending upwardly and forwardly opposite ends of a transverse member 104. Pivot member 100 also includes a support structure 106 to which air spring 24 and shock absorber 26 are attached. Support structure 106 may include a pair of closely spaced members 107 extending at an angle upwardly and rearwardly from a central portion of transverse member 104. Accordingly, pivot member 100 has a substantially V-shaped side profile. A plate 107a may extend between members 107 to provide a surface for mounting air spring 24.

In order to pivotally attach pivot member 100 to frame base 110, transverse member 104 preferably includes a pair of pivot rods 112 fixably secured thereto and extending outwardly in opposite directions. Each pivot rod 112 may engage a bushing 114 secured to base 110. Bushing 114 preferably includes a triangularly-shaped piece of polyurethane and includes an U-shaped notch to receive and rotatably secure pivot rod 112. Alternatively, bushing 114 may include a through hole to receive the pivot rod 112. Bushing 114 may be formed of a wide variety of materials including metal such as brass and engineered polymers such as acetal or polyamide. Bushing 114 may be fastened to base 110 in abutment with a triangular bracket 116. Triangular bracket 116 may be welded to the base at the transition point between base 110 and upwardly extending rails 118. Bushings 114 provide for the smooth rotation of the pivot member relative to frame 108.

Upwardly extending rails 118 extend from base 110 at a slight incline such that the angle formed therebetween approximates the angle between the seating surface 12 and back rest 14. Rails 118 preferably include an inturned portion 120 in which the rails extend inwardly toward each other to a point where they are connected by a cross brace 122. From brace 122, rails 126 extend upwardly in substantial parallel alignment. Guide blocks 124, shown in FIG. 8, may be inserted over the parallel extending portion 126 of the guide rails and adapted to slide relative thereto. Guide blocks 124 may be attached to a back rest plate 128 forming a mounting surface which is rigidly securable to back rest 14 of seat 11. Accordingly, when the seat moves relative to the frame, guide blocks 124 may slide up and down the parallel rails. Guide blocks 124 may be similarly formed to those described above with respect to FIGS. 4 and 5. Alternatively, a one piece guide block (not shown) may be employed having a pair of apertures formed therein and similar to the apertures formed in the individual guide blocks discussed above.

Air spring second end 24b may be rigidly secured to the frame adjacent cross brace 122 and air spring first end 24a may be rigidly secured to pivot member 100 on support structure 106. One of the first or second ends may be mounted to a slanted standoff 123 so that the air spring 24 will be substantially in axial alignment when air spring 24 is fully inflated. In addition, shock absorber second end 26b may be pivotally secured to the parallel rails at a point above the guide blocks, and pivotally secured at first end 26a to pivot member 100. In an alternative embodiment (not shown), air spring 24 may also be pivotally secured at either one or both ends in order to maintain axial alignment throughout its stroke.

The movement of the seat and pivot member of the preferred embodiment is similar to the movement described with regard to the embodiment shown in FIGS. 1–3. Additionally, the movement of the seat is controlled by air spring 24 and shock absorber 26 in a similar manner as described above. Accordingly, seat 11 and an occupant therein will be isolated to some degree from shocks and impacts which are imparted on the boat or vehicle.

In addition to providing increases in manufacturing efficiencies, the preferred embodiment also provides a compact design. As shown in FIG. 7, a portion of the air spring 24 and shock absorber combination remain within the dimensions of seat 11 and does not extend much beyond the upper portion of back rest 14. Therefore, a very compact design is obtained which is important since the deck of a boat or floor of a vehicle provides only limited space to accommodate a seat. The compact design also permits ease in employing the present invention in retrofit applications.

As set forth above, seat suspension assembly 10 of the present invention maintains a relatively open and unobstructed area beneath seating surface 12. This feature allows the seat to be employed in further applications which permit the seat's occupant to selectively sit or stand. In certain boating environments, it is customary for the boat seat to be spaced above the hull such that there is clearance for the seating surface to be swung down out of the way, thereby permitting the occupant to stand. For example, it may be desirable to assume a standing position for visibility purposes when maneuvering the boat in docking situations.

Figure 9:
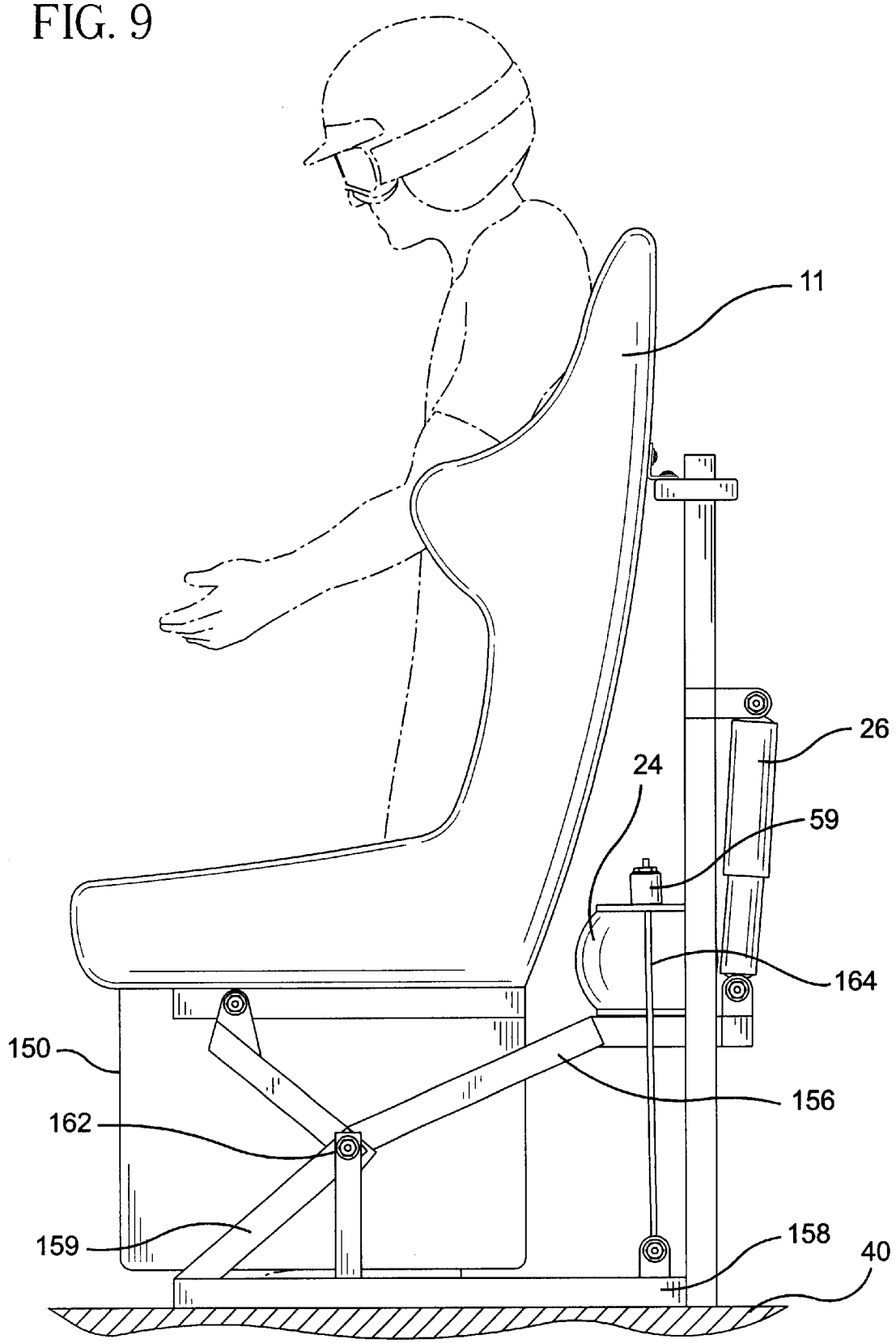
FIG. 9 is a side elevational view of an alternative embodiment of the suspension seat showing the seating surface rotated toward a vertical orientation allowing an occupant to stand.
Figure 10:
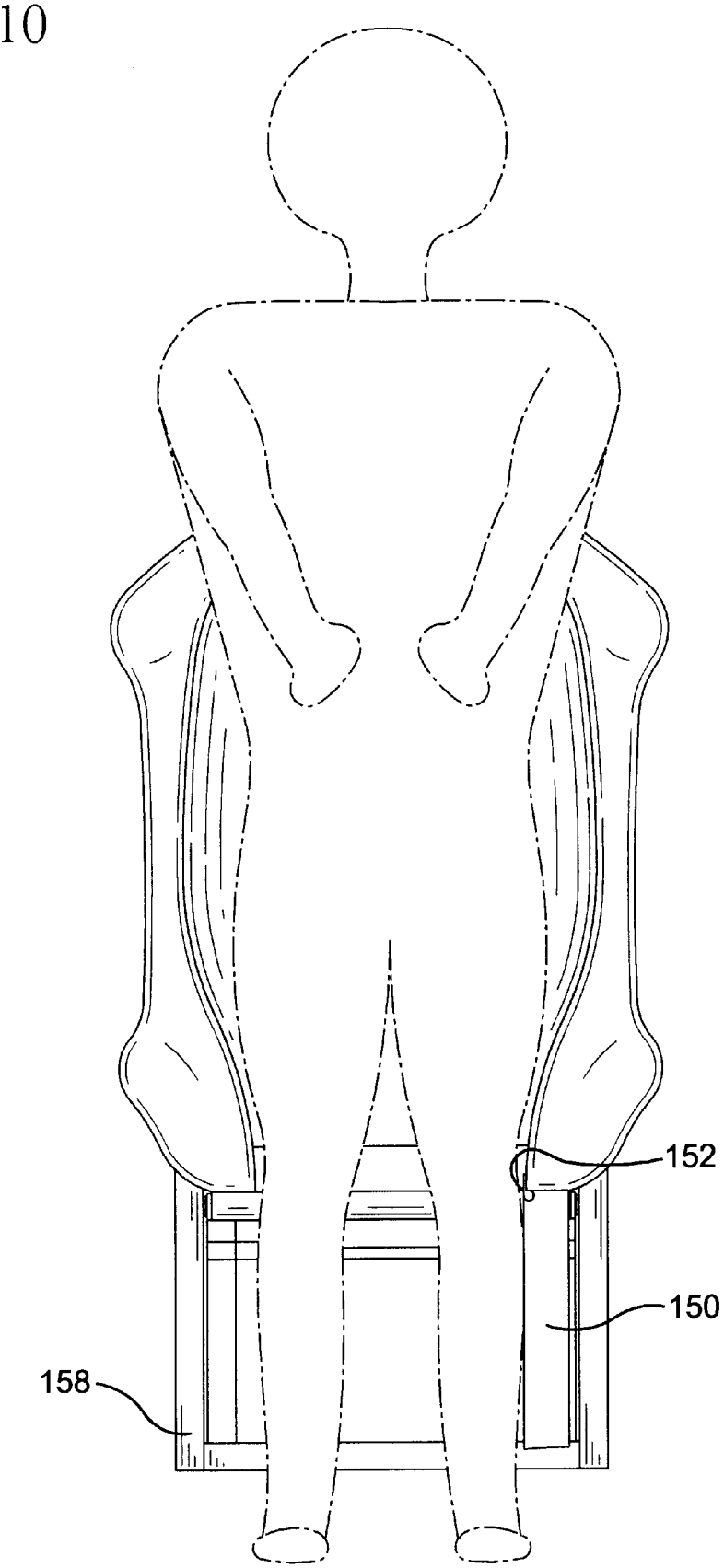
FIG. 10 is a front elevational view of the alternative embodiment shown in FIG. 9.

Referring to FIGS. 9 and 10, since the seat of the present invention does not include components disposed below the seating surfae, the seat of the present invention may include a modified seating surface 150 which is hinged along a side edge 152 or back edge (not shown) to allow the seat to swing down out of the way. In this alternative embodiment, pivot member 156 is spaced above the base bottom rails 158 and this can be accomplished in a variety of ways including adding a triangular member 159 to the base, thereby forming a pivot member attachment point 162 vertically above bottom rails 158 and fixed surface 40. In addition, tie rods 164 which secure mounting bar 60 to the frame would also be extended to accommodate the increase in distance between the mounting bar 60 and the base attached to the deck of the boat 40. The upwardly extending rails would also have an increased length in order to accommodate the increased space beneath the seating surface. Pivot member 156 is substantially similar to that shown in FIGS. 1–3.

Figure 11:
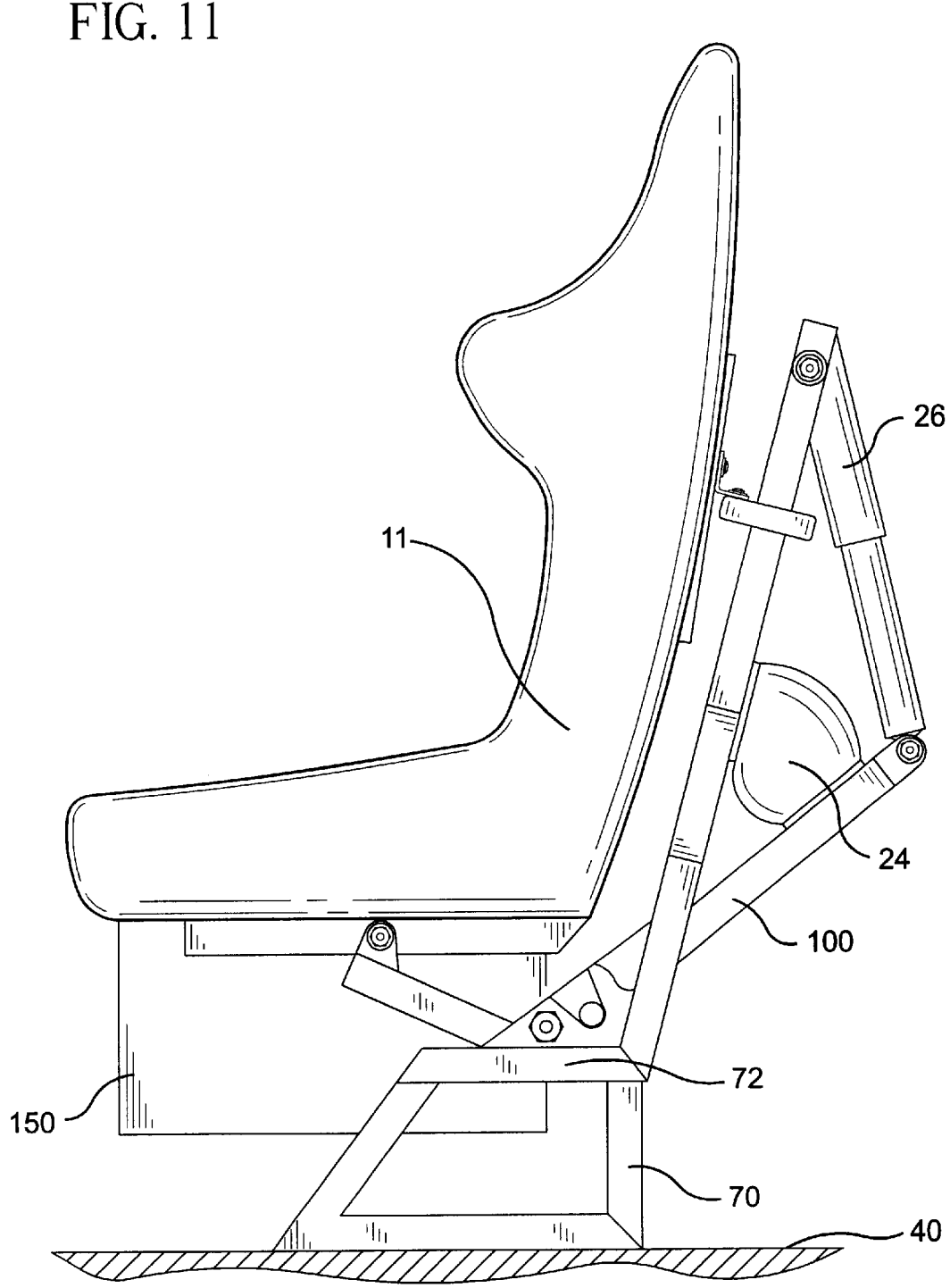
FIG. 11 is a side elevational view of the preferred embodiment of the suspension seat showing the seating surface rotated toward a vertical orientation allowing an occupant to stand.

In a preferred alternative embodiment, the pivot member and base may be similarly formed as in FIGS. 7 and 8. The assembly may be spaced from the fixed surface 40 by modifying the base to include a pair of somewhat U-shaped supports 70 as shown in FIG. 11. One of supports 70 may be secured beneath a shortened base rail 72 on each side of seat 11. Supports 70 may be added to the frame to increase the vertical distance between seating surface 150 and fixed surface 40, e.g., the deck of a boat. Supports 70 may be formed from a plurality or welded together tubular members made of steel or aluminum or of a single unitary structure formed into the appropriate configuration by bending. Supports 70 essentially elevate seat 11 to a height where a seat occupant may comfortably sit or stand as required. Accordingly, it is within the contemplation of the present invention that supports 70 may be formed in a variety of ways to achieve this objective.

FIGS. 9–11 illustrate seating surface 12 as hinged along the side edge. It is also within the contemplation of the present invention for the seat to be hinged along a back edge and swing rearwardly behind the occupant's legs. The hinged seat is held in the closed position by a latching mechanism of the type well known in the art.

In all the embodiments described above, biasing device 24 is preferably an air spring and may be of the type commercially available and marketed by Goodyear or Firestone, having a 6 inch bore and a stroke length of approximately 3 inches. It is within the contemplation of the present invention that various stroke and bore combinations may be varied in order to accommodate differing seat and frame dimension as well as customizing ride comfort. Air spring 24 generally consists of an elastomeric body 24c sealed at each end to a rigid end plate 24d. At least one of the end plates includes a threaded opening 24e to form a port in which fluids, such as pressurized air, may be introduced into the elastomeric body 24c. The dampening function is preferably performed by shock absorber 26 and may be a standard type available commercially, used in automotive applications. This may include a standard oil filled device or may include a shock absorber which is gas charged. The particular sizes of air spring and shock absorber may be chosen to fit a particular seat weight and range of occupant weight. However, it has been found on testing that an air spring having a 6 inch diameter accommodates a wide range of applications. The dampening device may alternatively be of the type used in industrial applications such as those employed to buffer impacts between machine parts.

In alternative embodiment (not shown), the dampening device in the form a shock absorber may be eliminated. The dampening function would then be achieved by the inherent properties of the air spring and design of the pivot member.

Figure 12:
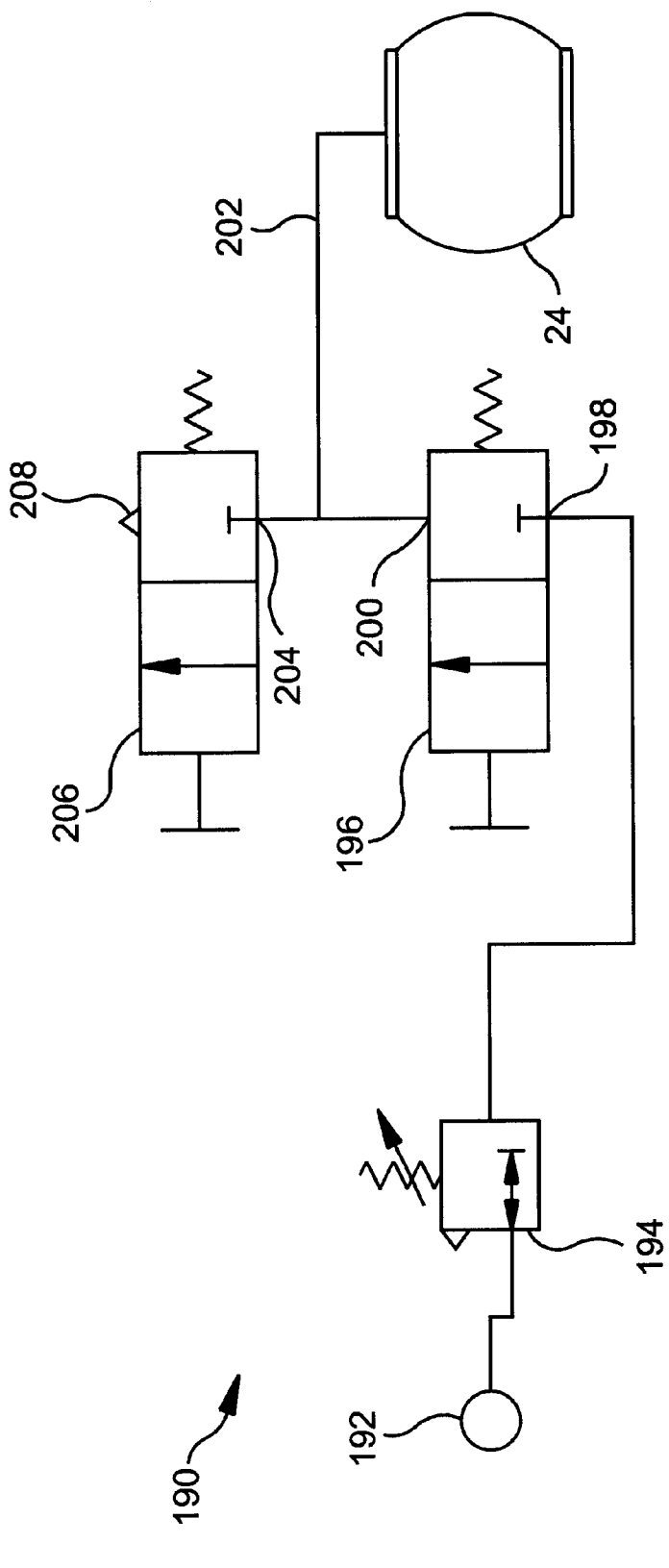
FIG. 12 is a circuit diagram of the seat suspension control system.

Referring to FIG. 12, the present invention further includes a control system 190 for varying the pressure in air spring 24 in order to adjust the performance characteristics of the seat suspension system. In general, control system 190 permits the occupant of the seat to adjust the pressure in air spring 24, thereby varying the spring rate. The control system is preferably pneumatic and includes a source of pressurized air 192 in the form of a compressor. The compressor may be operatively connected by flexible tubing to a pressure regulator 194 which is adjustable to regulate the line pressure of the control system. Pressurized air of a predetermined pressure may be operatively connected to a controller including pair of manually operated valves hooked up in series as shown in FIG. 12. The first valve 196 is a normally closed 2/2 valve having an input port 198 and an output port 200. The line pressure is connected to input port 198 and output port 200 is operatively connected to air spring 24 by air line 202. The input port 204 of second valve 206 is connected in parallel to first valve 196 and is connected to line 202 upstream of air spring 24. The output 208 of second valve 206 is vented to the surroundings.

Upon activation of first valve 196, pressurized air will flow into air spring 24 resulting in pressurization thereof. As this occurs, the operator will feel the seat move upward slightly as the force exerted by the spring surpasses the force generated by the occupant's weight. At this point, the occupant's weight is supported by air spring 24 permitting air spring 24 to perform its motion accommodating function. Regulator 194 may be set to a pressure such that the maximum pressure, which air spring 24 should be subjected to, is not exceeded regardless of how long the operator keeps first valve 196 in the open, pressurizing position. Air can be vented from air spring 24 by actuating second valve 206. The greater the pressure in air spring 24 the firmer the support system and ride experienced by the occupant. Conversely, the lesser the pressure the softer the suspension.

It is also within the contemplation of the present invention that the control system could include a single 3/3 valve having a blocked center. The valve would be provided with an actuator movable between three positions, including a charged, discharge and maintain position.

The control valve or valves, which permit the occupant to adjust the spring rate of air spring 24 is preferably secured to the seat itself, such as on the side thereof adjacent a seat armrest. As shown in FIGS. 1, 2 and 7, the first and second valves may be incorporated in a control box 210 which is preferably located on the side portion of seat 11 easily within reach of the occupant/operator while seated. Since the control valve may be connected to the air spring by a flexible air tubing, the control valve may be located in almost any position. However, it would be most desirable to locate it such that the operator has easy access thereto during operation of the vehicle. Accordingly, the operator may adjust the ride characteristics depending on the various factors, including the conditions of the water and the speed of the boat or other personal preferences. Since the weight of the occupant has a significant impact on the performance of the suspension, the ability of the individual to customize the suspension so that it is comfortable for giving conditions, is highly desirable.

Although the illustrative embodiments of the present invention have been described herein with reference to the accompanying drawings, it is to be understood that the invention is not limited to those precise embodiments, and that various other changes and modifications may be effected therein by one's skilled in the art without departing from the scope or spirit of the invention.

What is claimed is:

1. A seat assembly comprising:

a seat having a bottom surface;

a frame including a base secured to a fixed surface and a support member extending upwardly therefrom, wherein said support member includes a pair of spaced rails disposed behind said seat;

a guide extending between each one of said pair of spaced rails and said seat for guiding movement of said seat relative to the fixed surface;

a substantially rigid pivot member having a forward portion and a rearward portion, said pivot member being pivotally secured to said frame at a pivot point disposed on said pivot member between said forward portion and said rearward portion, and said forward portion being pivotally secured to said seat, said pivot member permitting said seat to move relative to the fixed surface; and a biasing device extending between said frame and said rearward portion of said pivot member to accommodate the movement between said seat and said frame.

2. The seat assembly as defined in claim 1 further including
a dampening device extending between said frame and said pivot member to dampen the movement between said seat and said frame.

3. The seat assembly as defined in claim 1 wherein said biasing device has an adjustable spring rate for adjusting suspension characteristics of the seat assembly.

4. The seat assembly as defined in claim 3 wherein said biasing device includes an air spring and said seat assembly includes an a pneumatic control system having a controller for adjusting the spring rate of said air spring thereby adjusting the characteristics of said suspension system.

5. The seat assembly as defined in claim 4 wherein said controller is operatively connected to a pressure source and said air spring for controlling a supply of pressurized air to said air spring, said controller being positioned so as to be actuatable by an occupant of said seat.

6. The seat assembly as defined in claim 5 wherein said controller is disposed on said seat such that said seat and said controller move together thereby permitting an occupant of said seat to operate said controller.

7. The seat assembly as defined in claim 2 wherein said biasing device and said dampening device are disposed on said seat assembly behind said seat.

8. The seat assembly as defined in claim 1 wherein said pivot member includes a pair of outwardly extending rods and said base includes a pair of spaced brackets having an aperture therein for receiving said pair of rods.

9. A seat assembly comprising:
a seat including a seating surface disposed generally parallel to a fixed surface for supporting an occupant of said seat;
a frame secured to the fixed surface;
a rigid pivot member having a first portion rotatably secured to said frame and a second portion rotatably secured to said seat thereby permitting said seat to move relative to the fixed surface;
an air spring; and
a shock absorber, said air spring and said shock absorber being disposed behind said seating surface so as not to interfere with downward movement of said seat said air spring and said shock absorber being operatively connected to said seat and said frame to permit controlled movement of said seat relative to the fixed surface and to isolate said seat and an individual seated within from shocks imparted to the fixed surface.

10. The seat assembly as defined in claim 9 further including a pneumatic control system having a controller for adjusting a spring rate of said air spring thereby adjusting the characteristics of said air spring.

11. The seat assembly as defined in claim 10 wherein said controller includes a pair of manually actuatable valves operatively connected to said air spring and disposed on said seat to be actuatable by the individual seated therein.

12. The seat assembly as defined in claim 9, wherein said pivot member has a third portion extending rearwardly behind said seat, and said air spring and said shock absorber each have a first and second end, said first ends being connected to said frame and said second ends being connected to said third portion of said pivot member.

13. The seat assembly as defined in claim 9, wherein said suspension system includes a biasing device having an elastomeric body and port to permit the introduction of a fluid, said suspension system further including and a controller including a valve operatively connected to said biasing device and said controller being disposed on said seat to permit access thereto by a seat occupant, said controller permitting a spring rate of said biasing device to be adjusted.

14. A seat assembly comprising:
a seat having a bottom surface;
a frame including a base secured to a fixed surface and a support member extending upwardly therefrom;
a substantially rigid pivot member having a forward portion and a rearward portion, said pivot member being pivotally secured to said frame at a pivot point disposed on said pivot member between said forward portion and said rearward portion, and said forward portion being pivotally secured to said seat, said pivot member permitting said seat to move relative to the fixed surface, said pivot member including a pair of outwardly extending rods and said base including a pair of spaced brackets having an aperture therein for receiving said pair of rods; and
a biasing device extending between said frame and said rearward portion of said pivot member to accommodate the movement between said seat and said frame.

15. The seat assembly as defined in claim 9, wherein said frame includes a portion disposed behind said seat and said air spring is operatively connected to the frame portion disposed behind said seat.

16. The seat assembly as defined in claim 9, wherein said seat includes a back rest extending generally upwardly from said seating surface, and said air spring being disposed behind back rest.

17. The seat assembly as defined in claim 9, wherein said frame includes a base secured to the fixed surface and a support member extending upwardly therefrom, the support member including a pair of spaced rails disposed behind a back rest of said seat, each of said rails including a guide slidingly engaged therewith, each of said guides being secured to said seat back rest such that said guides support said seat and permit movement of said seat relative to the fixed surface.

* * * * *